US012698803B2

(12) United States Patent
Bertolini et al.

(10) Patent No.: US 12,698,803 B2
(45) Date of Patent: Aug. 4, 2026

(54) SUPPORT ASSEMBLY FOR MOVEABLE SHAFTS

(71) Applicant: AKTIEBOLAGET SKF, Gothenburg (SE)

(72) Inventors: Andrea A. Bertolini, Carrara (IT); Fausto Baracca, Massa (IT); Fabio Cavacece, Rome (IT)

(73) Assignee: Aktiebolaget SKF, Gothenburg (SE)

( * ) Notice: Subject to any disclaimer, the term of this patent is extended or adjusted under 35 U.S.C. 154(b) by 103 days.

(21) Appl. No.: 18/522,387

(22) Filed: Nov. 29, 2023

(65) Prior Publication Data

US 2024/0209897 A1      Jun. 27, 2024

(30) Foreign Application Priority Data

Dec. 21, 2022    (IT) ........................ 102022000026382

(51) Int. Cl.
    *F16C 33/78*     (2006.01)
    *F16C 23/08*     (2006.01)
    *F16C 33/80*     (2006.01)

(52) U.S. Cl.
    CPC ........ *F16C 33/7896* (2013.01); *F16C 23/084* (2013.01); *F16C 33/805* (2013.01)

(58) Field of Classification Search
    CPC ................ F16C 33/782; F16C 33/7859; F16C 33/7863; F16C 33/7866; F16C 33/7869; F16C 33/7873; F16C 33/7876; F16C 33/7879; F16C 33/7883; F16C 33/7886; F16C 33/7889; F16C 33/7896; F16C 33/80; F16C 33/805
    See application file for complete search history.

(56) References Cited

U.S. PATENT DOCUMENTS 3,499,654 A    3/1970   Lower
4,093,324 A    6/1978   Carrigan
         (Continued)

FOREIGN PATENT DOCUMENTS

DE      2839584 A1    3/1980
EP      1065394 A1    1/2001
         (Continued)

OTHER PUBLICATIONS

International Search Report for corresponding Italy Patent Appln. No. 102022000026382 dated May 31, 2023.

*Primary Examiner* — James Pilkington
(74) *Attorney, Agent, or Firm* — Stinson LLP

(57) ABSTRACT

A support assembly includes a casing having an internal mounting seat, a bearing unit mounted on the internal mounting seat of the casing, and a first sealing device. The bearing unit includes a radially inner ring, a radially outer ring, and a plurality of rolling elements interposed between them. The first sealing device includes a first shield fixed to the radially outer ring, a second shield fixed to the radially inner ring and positioned axially internal with respect to the first shield, and a protective shield interference fit on a cylindrical seat of the casing and positioned axially internal relative to the second shield. The first and second shield define a first labyrinth seal between them. The protective shield and the second shield define a second labyrinth seal between them. The protective shield extends axially inward to an axial boundary of the casing at the cylindrical seat.

12 Claims, 3 Drawing Sheets

(56) References Cited

U.S. PATENT DOCUMENTS

| | | | | |
|---|---|---|---|---|
| 5,328,276 | A | 7/1994 | Linteau | |
| 6,619,851 | B2 * | 9/2003 | Vogelgesang | F16C 19/184 |
| | | | | 384/488 |
| 10,550,888 | B2 | 2/2020 | Yamada et al. | |
| 11,867,233 | B2 * | 1/2024 | Baracca | F16C 33/7886 |
| 12,241,505 | B2 | 3/2025 | Bertolini et al. | |
| 2003/0039422 | A1 | 2/2003 | Nisley et al. | |
| 2003/0127803 | A1 | 7/2003 | Yokoyama et al. | |
| 2015/0267753 | A1 | 9/2015 | Ciulla et al. | |
| 2015/0345562 | A1 | 12/2015 | Varnoux et al. | |
| 2018/0100546 | A1 | 4/2018 | Ress | |
| 2019/0010989 | A1 | 1/2019 | Falaschi et al. | |
| 2022/0325754 | A1 | 10/2022 | Baracca et al. | |
| 2023/0265888 | A1 * | 8/2023 | Bertolini | F16C 33/7896 |
| | | | | 384/480 |

FOREIGN PATENT DOCUMENTS

| | | | | |
|---|---|---|---|---|
| EP | 2985482 | A2 | 3/2015 | |
| EP | 1245847 | | 10/2022 | |
| EP | 4075003 | | 10/2022 | |
| FR | 2515288 | A1 | 4/1983 | |
| JP | S5023544 | | 3/1975 | |
| JP | 2003131372 | A | 6/2003 | |
| JP | 2007132428 | A | 5/2007 | |
| WO | 03074888 | A1 | 9/2003 | |
| WO | WO-2014060042 | A1 * | 4/2014 | F16C 33/768 |

* cited by examiner

SUPPORT ASSEMBLY FOR MOVEABLE SHAFTS

CROSS-REFERENCE TO RELATED APPLICATIONS

This application is based on and claims priority to Italian Patent Application No. 102022000026382 filed on Dec. 21, 2022, under 35 U.S.C. § 119, the disclosure of which is incorporated by reference herein.

FIELD

The present disclosure relates to a support assembly for moveable shafts. In particular, the present disclosure relates to a support assembly for moveable shafts, which is particularly relevant in applications in the food industry.

SUMMARY

Exemplary embodiments described herein have innovative features, no single one of which is indispensable or solely responsible for their desirable attributes. Without limiting the scope of the claims, some of the advantageous features will now be summarized.

According to at least one non-limiting exemplary embodiments, a support assembly may include a casing with an internal mounting seat and a cylindrical seat adjacent the internal mounting seat, a bearing unit mounted on the internal mounting seat of the casing, a first sealing device, and a protective shield. The bearing unit may include a radially inner ring and a radially outer ring. The first sealing device may include a first shield fixed to the radially outer ring, a second shield fixed to the radially inner ring and positioned axially internal with respect to the first shield, the first shield and the second shield defining between them a first labyrinth seal. The protective shield may be interference fit on the cylindrical seat of the casing and may be positioned axially internal relative to the second shield, where the protective shield and the second shield define between them a second labyrinth seal. The protective shield may extend axially inward within an axial boundary of the casing defined at the cylindrical seat of the casing.

According to at least one non-limiting exemplary embodiment, the protective shield may further include a radially outer first cylindrical portion that is interference fit on the cylindrical seat (e.g., surface) of the casing and a first flange portion integrally connected to an axially outer end of the cylindrical portion and extending radially inward therefrom.

According to at least one non-limiting exemplary embodiment, the second labyrinth seal may include a first section defined between an inner radial end of the first flange portion and a second cylindrical portion of the second shield fixed to the radially inner ring, a second section defined between the first flange portion and a second flange portion of the second shield, and a third section defined between a radially inner surface of the radially outer ring and a radially outer end of the second flange portion.

According to at least one non-limiting exemplary embodiment, the support assembly may further include a radially outer volume adjacent the second section of the second labyrinth seal and defined between the first flange portion and an axially inner surface of the radially outer ring, where the radially outer volume may be filed with lubricating grease.

According to at least one non-limiting exemplary embodiment, the first flange portion may include a first frustoconical portion between the radially outer end and a radially inner end of the first flange portion, the second flange portion may include a second frustoconical portion between the radially inner end and a radially outer end of the second flange portion. An inclination of the first frustoconical portion may be equal to an inclination of the second frustoconical portion.

According to at least one non-limiting exemplary embodiment, the protective shield may have a thickness between 0.75 mm and 0.85 mm.

According to at least one non-limiting exemplary embodiment, an interference between the protective shield and the cylindrical seat (e.g., surface) of the casing may be between 0.05 mm and 0.15 mm.

According to at least one non-limiting exemplary embodiment, the support assembly may further include an axial distance between an axially outer annular surface of the first flange portion and the axially inner surface of the radially outer ring that may be between 1.9 mm and 2.1 mm.

According to at least one non-limiting exemplary embodiment, the support assembly may further include a radial distance between the radially inner end of the first flange portion and the cylindrical portion of the second shield that may be between 0.4 mm and 0.6 mm.

According to at least one non-limiting exemplary embodiment, the support assembly may further include an axial distance between the axially outer annular surface of the first flange portion and an axially inner surface of the second flange portion that may be between 1.5 mm and 1.7 mm.

According to at least one non-limiting exemplary embodiment, the first shield (e.g., screen) may include an elastomeric element formed on a radially outer surface thereof. The elastomeric element may include a sealing lip in contact with a radially outer surface of the radially inner ring of the bearing unit.

According to at least one non-limiting exemplary embodiment, the radially outer ring may include a convex radially outer surface with a shape that is substantially similar to the convex radially outer surface of the radially outer ring.

BRIEF DESCRIPTION OF THE DRAWINGS

The disclosure is described below with reference to the attached drawings, which show some non-limiting example embodiments of the disclosure, in which.

DETAILED DESCRIPTION

Known support assemblies, particularly those used in the food industry, may be formed by a casing, provided with a fastening flange for fastening to a frame of a machine, and a bearing unit, positioned inside the casing to support a moveable shaft. The bearing unit may form a ball-and-socket coupling with the casing itself to compensate for any static mounting misalignments between the moveable shaft and the static frame.

In food industry applications, machinery and the components thereof may be washed frequently for hygienic reasons, which may involve somewhat aggressive and corrosive washing fluids. Consequently, the aforementioned known bearing units are also provided with sealing devices, which may be arranged on opposing axial ends of the bearing unit and may include, at least on the rear of the casing, i.e., the portion of the casing oriented towards the frame, a protective shield integral with the bearing unit intended to prevent any external contaminants from entering the bearing units.

In the support assemblies defined above, although the bearing unit may be protected by the sealing devices, the same is not true of the casings. In particular, the casing at the rear end of the support assembly, which can still be reached by the washing fluids at relatively high pressures that penetrate the space between the casings and the bearing units, is not protected by the sealing devices. Washing fluids that penetrate this space can adversely affect the service life of the support assembly, as a result of oxidization and corrosion and strict hygiene requirements that may be required of support assemblies in food industry applications, as a result of stagnating liquids.

On the other hand, using additional seals on the rear of the casing would hinder access thereto and complicating the process of mounting the casing and/or the bearing unit. Furthermore, using an additional seal can increase the axial dimensions of the support assembly, which is not always an option due to size constraints.

Figure 1:
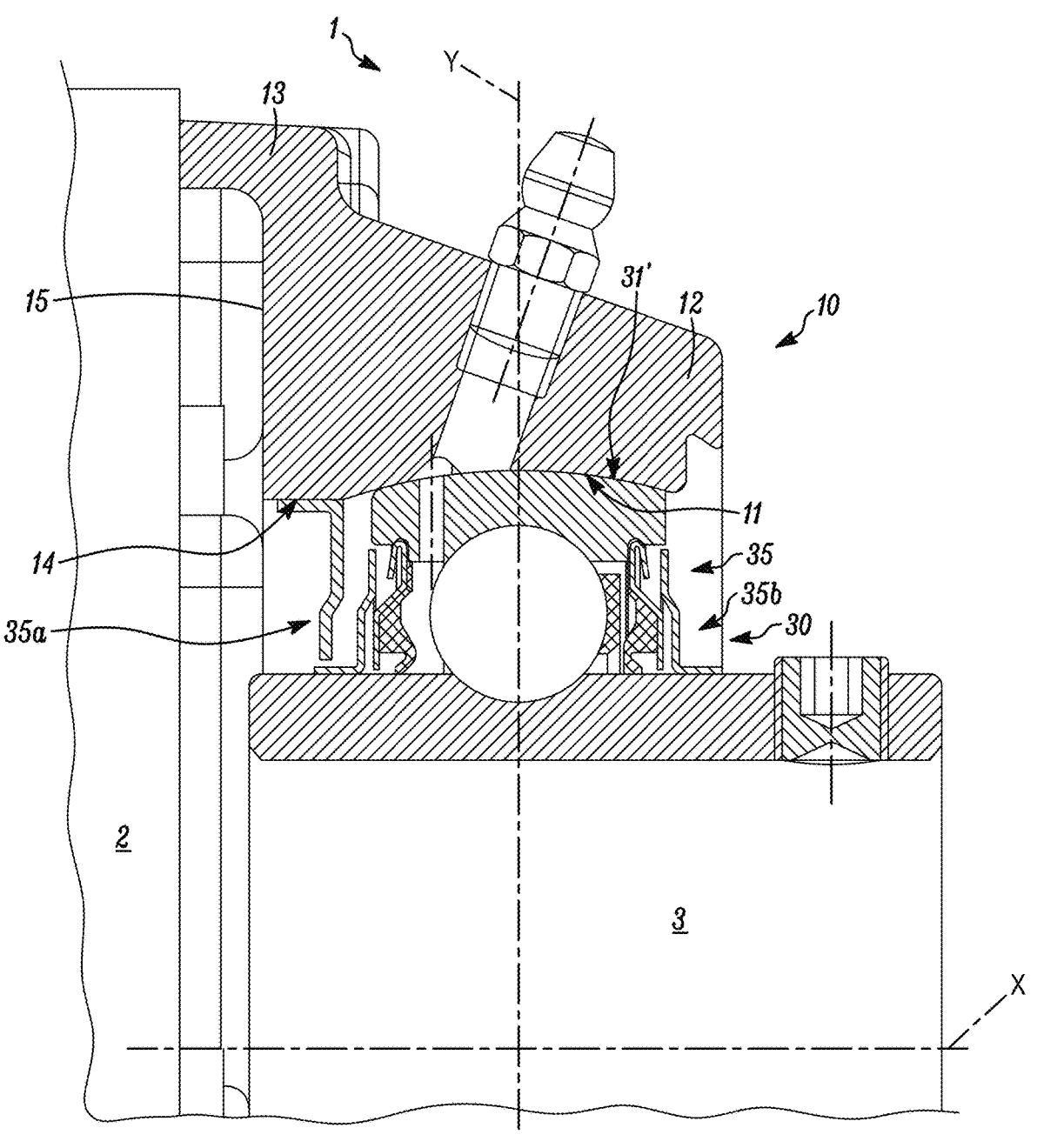
FIG. 1 illustrates exemplary embodiments of a support assembly according to the present disclosure.

As illustrated in FIG. 1 in some embodiments, a support assembly 1 may be interposed between a first mechanical element 2 and a second mechanical element 3. In some embodiments, first mechanical element 2 may be a static frame 2 and second mechanical element 3 may be a rotary shaft 3 of a food-industry machine.

In some embodiments, support assembly 1 may include a flanged casing 10 designed to be mounted on first mechanical element 2 (e.g., static frame 2) and provided internally with a spherical internal mounting seat 11. Support assembly 1 may further include a bearing unit 30 mounted inside mounting seat 11 to support second mechanical element 3 (e.g., rotary shaft 3), and a pair of sealing devices 35. Each sealing device 35a and 35b may be arranged on an opposing axial end of bearing unit 30 to prevent ingress of washing fluids and other contaminants into an interior of bearing unit 30. In some embodiments, bearing unit 30 may be moveable in relation to mounting seat 11 to withstand any initial static misalignment between first mechanical element 2 and second mechanical element 3 caused during the mounting process.

In some embodiments, flanged casing 10 may include a primary tubular body 12 open at opposing axial ends thereof and defining an exposed portion of support assembly 1 open away from first mechanical element 2 (e.g., static frame 2) (i.e., in an axially outer direction) and directly exposed to washing fluids and contaminants from an external environment, and a flange 13. The casing 10 includes an axially inner end and an opposite axially outer end spaced apart along the axis of rotation X, the axially inner end being adjacent to the first mechanical element 2. In some embodiments, flange 13 may be transverse to axis X, integral with primary tubular body 12, and provided with an internal cylindrical seat 14 arranged axially adjacent to mounting seat 11. In some embodiments, internal cylindrical seat 14 may be connected to mounting seat 11. Flange 13 may define an axially inner portion of support assembly 1 (e.g., the axially inner end of the casing 10) formed at an end axially opposite the exposed outer portion of support assembly 1 (e.g., the axially outer end of the casing 10). The axially inner end of support assembly 1 may be exposed to the external environment, although to a lesser degree due to being on the same side as first mechanical element 2 (e.g., static frame 2), which requires protection from ingress of washing liquid and contaminants into the interior of bearing unit 30.

In some embodiments, flange 13 may be axially delimited on an axially inner side opposite body 12 by an annular flat surface 15 into which internal cylindrical seat 14 opens.

Throughout the present disclosure and in the claims, terms and expressions indicating positions and orientations, such as "radial" and "axial", are to be understood with reference to a central axis of rotation X of bearing unit 30. "Radial" (e.g., radially) is understood as meaning a direction perpendicular to the axis of rotation X. For example, the terms "radially inner." "radially internal," and "radially inward" refer to a direction toward the axis of rotation X, and the terms "radially outer." "radially outward." and "radially external" refer to a direction away from the axis of rotation. "Axial" (e.g., axially") is understood as meaning a direction parallel to the axis of rotation X. In this disclosure, the terms "axially inner," "axially internal," and "axially inward" refer to a direction from the axially outer end of the casing 10 toward the axially inner end of the casing, and the terms "axially outer" and "axially outward" refer to a direction extending from the axially inner end of the casing toward the axially outer end of the casing.

Figure 2:
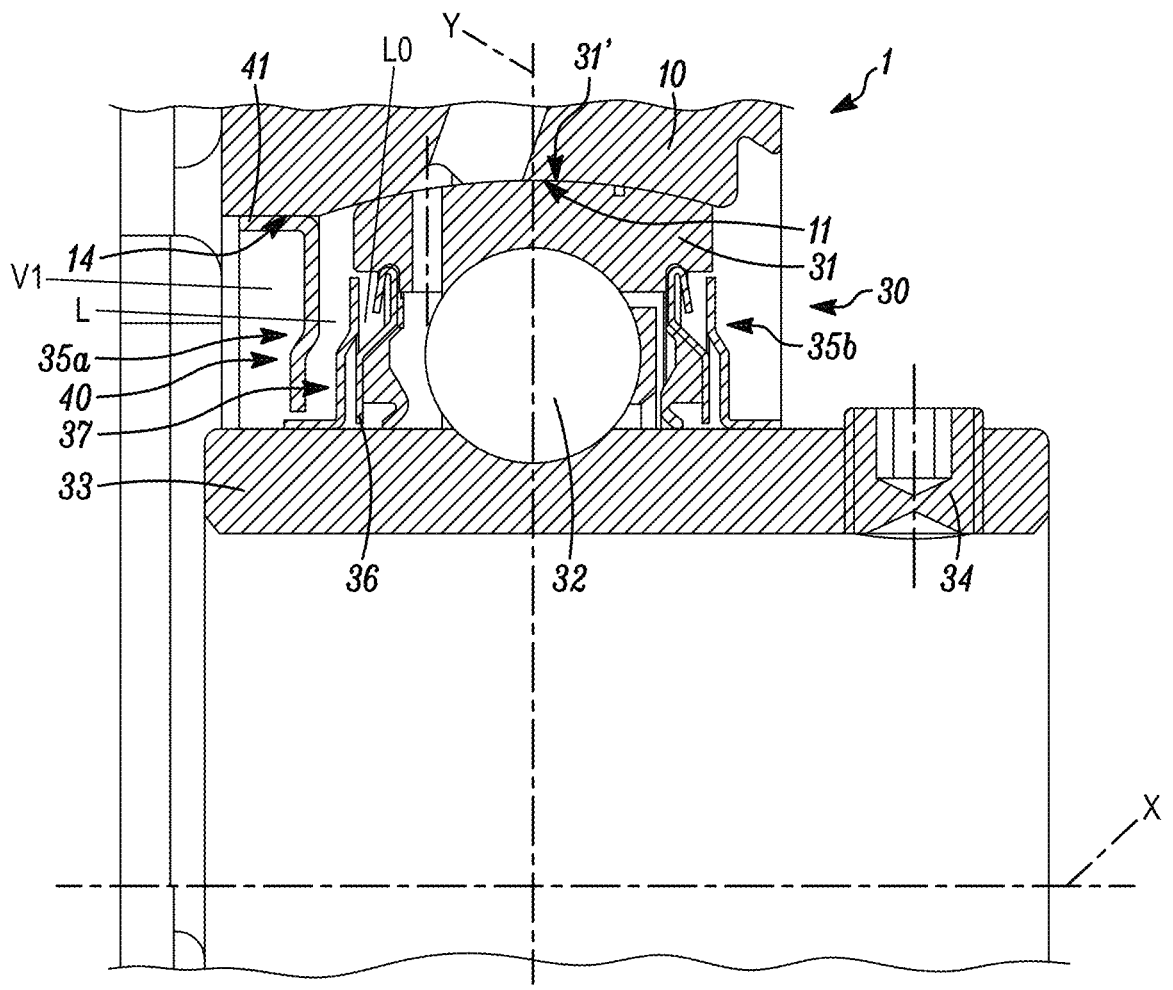
FIG. 2 illustrates an enlarged view of a rolling bearing of the support assembly of FIG. 1 according to exemplary embodiments of the present disclosure.

With reference to FIG. 2, bearing unit 30 may include a radially outer ring 31, a radially inner ring 33, and a plurality of rolling elements 32 interposed between radially outer ring 31 and radially inner ring 33 to enable relative rotation of the rings. In some embodiments, radially outer ring 31 may have a convex shape. In some embodiments, radially inner ring 33 may be provided with a fastener 34 at an axially outer end for securing bearing unit 30 to second mechanical element 3 (e.g., rotary shaft 3).

Throughout this disclosure, embodiments of bearing unit 30 are described as including a radially outer ring 31 that is stationary and a radially inner ring 33 that is rotating. However, it will be appreciated by a person of ordinary skill in the art that, in alternative embodiments, radially outer ring 31 may rotate and radially inner ring 33 may be stationary without departing from the scope of this disclosure. The descriptions and teachings of this disclosure can nevertheless be applied to such embodiments.

In some embodiments, radially outer ring 31 may include a convex surface 31' formed on a radially outer surface of outer ring 31 that can be coupled in mounting seat 11. A shape of convex surface 31' can match a shape of mounting seat 11 to facilitate alignment of bearing unit 30 inside casing 10 and allow a potential static misalignment of the shaft 3 mounted through the radially inner ring 33 with respect to the mounting seat 11 or the frame 2 experienced during installation.

In some embodiments, a pair of sealing devices 35 may be arranged on opposing axial ends of bearing unit 30 to prevent ingress of fluids and other contaminants from the external environment into the interior of bearing unit 30. A first sealing device 35a may be arranged on an axially inner end of support assembly 1 adjacent to first mechanical element 2 (e.g., static frame 2) to prevent ingress of washing fluids and other contaminants into the interior of bearing unit 30 and into cylindrical seat 14 and mounting seat 11. A second sealing device 35b may be arranged on an axially outer end of support assembly 1 opposite first mechanical element 2 to prevent ingress of washing fluids and other contaminants into the interior of bearing unit 30.

Figure 4:
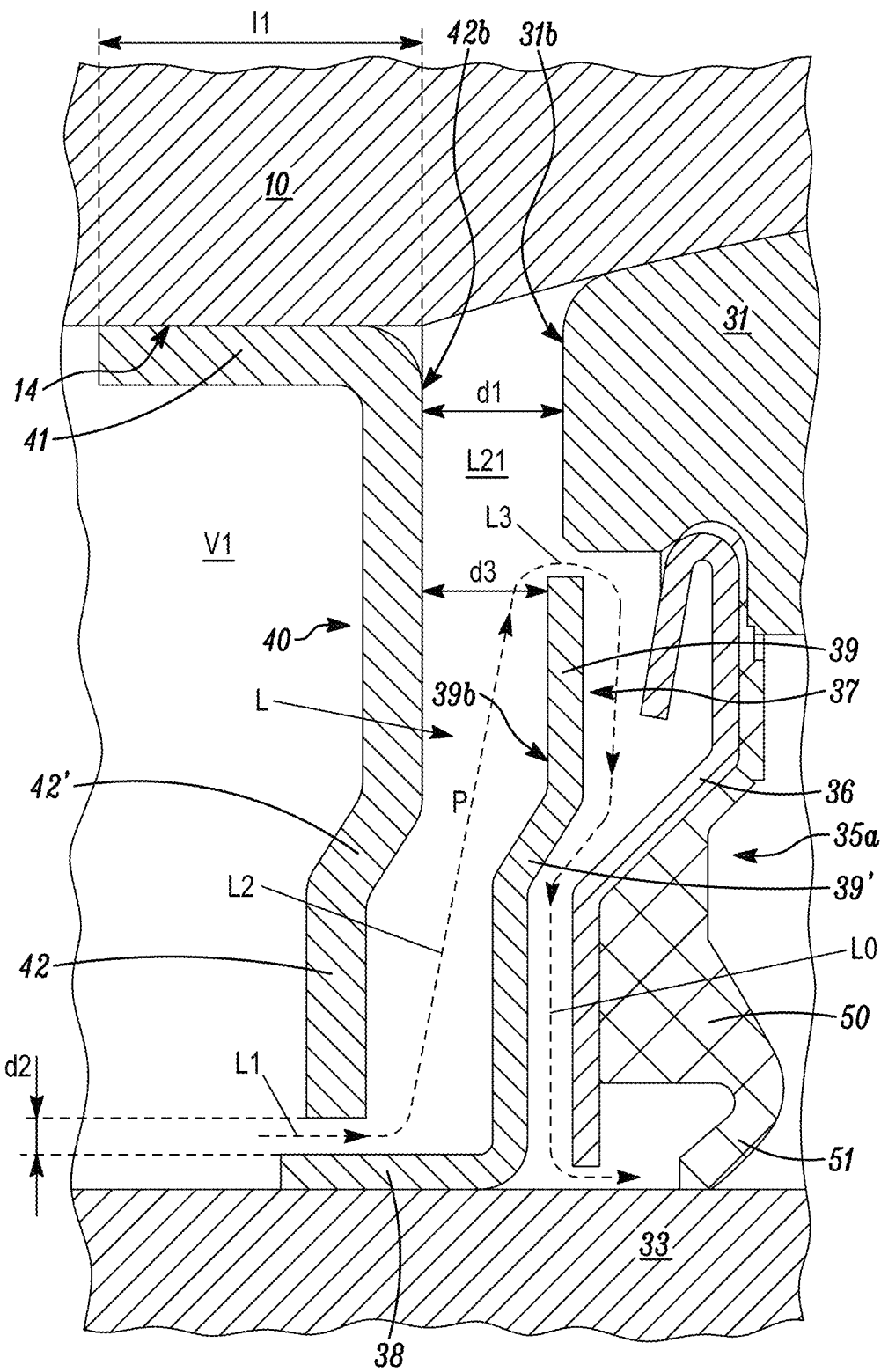
FIG. 4 illustrates an enlarged vie w of a portion A of the rolling bearing of FIG. 2 according to exemplary embodiments of this disclosure.

In some embodiments, each sealing device 35a and 35b of pair of sealing devices 35 is interposed between radially inner ring 33 and radially outer ring 31. In some embodiments, as illustrated in FIG. 4, sealing device 35a may include a first shield 36, provided with an elastomeric coating 50 and secured to radially outer ring 31, and a second shield 37, arranged axially inside of first shield 36 that is interference fitted onto a radially inner surface of radially inner ring 33. Second shield 37 may therefore rotate with radially inner ring 33 in embodiments in which radially inner ring is the rotating ring. In some embodiments, first shield 36 and second shield 37 may define a first labyrinth seal L0 formed as an annular passage through which fluid contaminants can flow in a radially inward direction, in the unlikely event of ingress of fluid contaminants therein. In some embodiments, first shield 36 may be made of metal.

In some embodiments, elastomeric portion 50 of first shield 36 may be formed on an axially inner side of first shield 36 and may include a contacting sealing lip 51. Contacting sealing lip 51 may contact a radially outer surface of radially inner ring 33.

In some embodiments, second shield 37 may include a cylindrical portion 38, interference fitted onto radially inner ring 33, and a shaped flange portion 39, rigidly connected to an axially outer end of cylindrical portion 38. In some embodiments, flange portion 39 extends in a radially outward direction toward axially outer ring 31 and defines a gap between a radially outer end thereof and a radially inner surface of radially outer ring 31. In some embodiments, shaped flange portion 39 includes a frustoconical portion 39' between the radially outer end of shaped flange portion 39 and a radially inner end of shaped flange portion 39.

As seen in FIG. 2, sealing device 35b may also include a first shield 36 and a second shield 37 arranged as a mirror image of first shield 36 and second shield 37 of sealing device 35a about a radius Y of bearing unit 30, which is transverse to axis X (see, e.g., FIGS. 1 and 2).

In some embodiments, sealing device 35a may further include a protective shield 40 arranged axially inside shield 37, interference fitted onto internal cylindrical seat 14 of casing 10, and axially confined within an axial boundary of casing 10 so as not to add to the overall axial dimension of support assembly 1.

Figure 3:
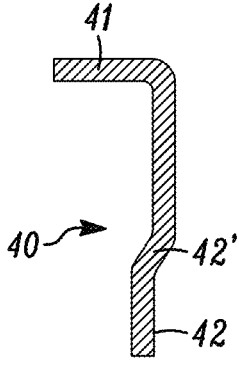
FIG. 3 illustrates a protective shield of a sealing device according to exemplary embodiments of the present disclosure.

As illustrated in FIG. 3, in some embodiments, a protective shield 40 may include a cylindrical portion 41, interference fitted onto cylindrical seat 14 of casing 10, and a shaped flange portion 42, rigidly connected to an axially outer end of cylindrical portion 41 and projecting in a radially inward direction. In some embodiments, a radially inner end of flange portion 42 defines a gap between it and cylindrical portion 38 of second shield 37. In some embodiments, shaped flange portion 42 of protective shield 40 includes a frustoconical portion 42' formed between the radially inner end of shaped flange portion 42 and a radially outer end of shaped flange portion 42. In some embodiments, frustoconical portion 42' of protective shield 40 has substantially the same inclination and is substantially the same distance from axis X as frustoconical portion 39' of second shield 37. Making frustoconical portions 42' and 39' with the same inclination advantageously prevents against contact between protective shield 40 and second shield 37 caused by axial play of components of bearing unit 30 and caused by a tolerance chain of the components of support assembly 1.

As illustrated in FIG. 4, in some embodiments, protective shield 40 may be mounted on casing 10 by machining radially inner surface 14 into casing 10, unlike in known flanged casings, which do not machine a radially inner surface into a casing. This creates an available volume V1 in which protective shield 40 can be seated. This novel component increases protection of a bearing unit of a flanged support assembly, e.g., support assembly 1, against external contaminants on a least protected end of the bearing unit (i.e., the axially inner end of bearing unit 30 at flange 13 and adjacent first mechanical element 2). In this way, protective shield 40 is an additional barrier of protection against ingress of external fluids and contaminants to sealing device 35a and the interior of bearing unit 30.

In some embodiments, protective shield 40 and second shield 37 may define between them a second internal labyrinth seal L as an additional annular passage arranged axially outside of labyrinth seal L0. In some embodiments, labyrinth seal L may direct ingress of contaminants in a radially outward direction (i.e., in the direction opposite labyrinth seal L0). In some embodiments, labyrinth seal L and labyrinth seal L0 may be in fluid communication, forming a sinuous path P. The sinuous shape of path P makes it particularly difficult for liquid and contaminants to move from the external environment outside casing 10 and into the interior of bearing unit 30, especially when bearing unit 30 and/or support assembly 1 is operationally stopped and/or being cleaned/washed. The sinuous shape of path P has the additional advantage of enabling discharge of any liquid and or contaminants that have penetrated into labyrinth seal L or L0 when bearing unit 30 and/or support assembly 1 is in use as a result of centrifugal forces caused by radially inner ring 33 rotating during use. In other words, path P can be travelled in both directions, producing a combined effect of forcing fluid and contaminants away from labyrinth seal L0 and toward labyrinth seal L, and preventing ingress of fluid and contaminants toward the interior of bearing unit 30.

In some embodiments, as illustrated in FIG. 4, labyrinth seal L may include a first section L1, defined between the radially inner end of shaped flange portion 42 of protective shield 40 and cylindrical portion 38 of shield 37, a second section L2, defined between shaped flange portion 42 and shaped flange portion 39 of second shield 37, and a third section L3, defined between radially outer ring 31 and the radially outer end of shaped flange portion 39. In some embodiments, third section L3 is in fluid communication with labyrinth seal L0.

In FIG. 4, external fluid and contaminants may travel path P, indicated with a dotted line, through sections L1, L2, and L3 of labyrinth seal L and through labyrinth seal L0 towards sealing lip 51 of elastomeric element 50 and an interior of casing 10.

A first advantage improving the effectiveness of the protection against external contaminants provided by sealing device 35a for bearing unit 30 is that an overall length of labyrinth seals L and L0 is approximately double a length of a single labyrinth seal L0 in known solutions (e.g., such as sealing device 35b). Consequently, path P that external fluids and contaminants travel to reach the interior of bearing unit 30 is made twice as long, making it more difficult for fluid and contaminants to reach the interior of bearing unit 30.

In known solutions that utilize only a single labyrinth seal, e.g., labyrinth seal L0, the flow of external fluids and contaminants remains laminar along the entire length of the labyrinth seal. In contrast, solutions consistent with this disclosure that include a second labyrinth seal, e.g., labyrinth seal L, create a turbulent flow of fluids and contaminants at labyrinth seal L. As illustrated in FIG. 4, labyrinth seal L includes first section L1 in which path P travels in an axially outward direction. Then, at second section L2, path P changes direction and travels in the radially outward direction. Finally, at third section L3, path P changes direction again and travels in the axially outward direction. This change in direction of path P, along which the flow of external fluid and contaminants follows, coupled with the frustoconical portions 42' and 39' of shaped flange portion 42 of protective shield 40 and shaped flanged portion 39 of second shield 37, respectively, creates a turbulent flow in second section L2. In contrast, the flow of external fluid and contaminants at first section L1 and third section L3 is a larimar flow. The turbulent flow causes more collisions between particles, causing the flow of fluid and contaminants to slow down in second section L2, reducing the amount of external fluid and contaminants that continue to travel along path P in third section L3 and labyrinth seal L0. In some embodiments, a radial length of first section L1 is no more than 0.6 mm.

In some embodiments, a radially outer volume L21 may be defined at a radially outer end of second section L2 and accumulate external contaminants traveling through section L2. Contaminants accumulate in radially outer volume L21 due to the centrifugal forces generated by rotation of second seal 37, causing contaminants to be forced radially outward into volume L21. Advantageously, external contaminants that accumulate in volume L21 have a near-zero speed, reducing the likelihood that any of these external contaminants continue traveling toward the interior of bearing unit 30. In some embodiments, radially outer volume L21 may be formed between an axially internal annular surface 42b of flange portion 42 of protective shield 40 and an axially external annular surface 31b of radially outer ring 31.

Due to the turbulent flow created in second section L2, the flow of external fluids and contaminants in third section L3 and in labyrinth seal L0 is significantly reduced both in volume and speed of particles. Thus, any contaminants that reach bearing unit 30 are moving more slowly and are much fewer in number than compared to known solutions utilizing labyrinth seal L0 alone.

Thus, solutions consistent with the present disclosure make flow of external fluids and contaminants significantly more unstable as compared to known solutions that create a laminar flow only. As the flow becomes more turbulent, unstable, and therefore uncertain, the flow becomes slower and more liable to stagnate in either labyrinth seal L or L0, thus reducing the risk of external fluids and contaminants entering bearing unit 30. And because the centrifugal forces generated by rotation of inner ring 33 and second shield 37 force fluid and contaminants away from the interior of bearing unit 30 along path P, during use, there is no risk of contamination due to stagnation of fluids.

In some embodiments, radially outer volume L21 may be filled with grease prior to use to further hinder ingress of solid contaminant particles toward the interior of bearing unit 30. In such embodiments, the turbulent flow in second section L2 combined with the grease in volume L21 creates a highly viscous moving flow that is able to slow and further block ingress of external fluids and contaminants.

In order to ensure adequate strength of protective shield 40 to withstand forces from contaminants contacting protective shield 40, it is advantageous to provide a protective shield 40 having a thickness of at least 0.75 mm and 0.85 mm. This thickness is at least 50% greater than the thicknesses of standard shields used in sealing devices in known solutions (which is approximately 0.5 mm).

To ensure that protective shield 40 is stably mounted and correctly positioned inside casing 10, the interference between protective shield 40 and casing 10 may be between 0.05 mm and 0.15 mm.

In some embodiments, axial distance d1 between axially inner surface 31b of radially outer ring 31 and axially outer surface 42b of shaped flange portion 42 of protective shield 40 may be 1.9 mm to 2.1 mm. Maintaining an axial distance d1 in this range advantageously ensures that these two surfaces do not contact each other even if bearing unit 30 and casing 10 experience a static misalignment of less than 3 degrees during installation.

In some embodiments, a radial distance d2 between flange portion 42 of protective shield 40 and cylindrical portion 38 of second shield 37 may be 0.4 mm to 0.6 mm. A distance d2 less than 0.4 mm increases the risk of contact between flange portion 42 and cylindrical portion 38 resulting from a radial play of the components of bearing unit 30 during use, even in embodiments where the radial play is less than an axial play. On the other hand, a distance d2 above 0.6 mm would adversely affect the efficiency of the labyrinth seal L.

In some embodiments, an axial distance d3 between the protective shield 40 and the shield 37 of the sealing device 35, and in particular between annular surface 42b of shaped flange portion 42 of protective shield 40 and an axially inner annular surface 39b of shaped flange portion 39 of shield 37 may be 1.5 mm to 1.7 mm. This ensures that a turbulent flow is created in section L2 while also ensuring that protective shield 40 and second shield 37 do not contact one another due to axial play of the components of bearing unit 30 during use and due to the tolerance chain of the components of support assembly 1.

It should be understood that, in addition to the embodiments of the disclosure described above, numerous other variants exist. These embodiments should also be understood to be examples and do not limit the scope, applications, or possible configurations of the disclosure. Indeed, although the description provided above enables the person skilled in the art to carry out the present disclosure at least according to one example configuration thereof, numerous variations of the components described could be used, without thereby departing from the scope of the disclosure, as defined in the attached claims, interpreted literally and/or according to their legal equivalents.

It should be noted that the use of particular terminology when describing certain features or embodiments of the disclosure should not be taken to imply that the terminology is being re-defined herein to be restricted to include any specific characteristics of the features or embodiments of the disclosure with which that terminology is associated. Terms and phrases used in this disclosure, and variations thereof, especially in the appended claims, unless otherwise expressly stated, should be construed as open-ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least"; the term "such as" should be interpreted as "such as, without limitation"; the term "includes" should be interpreted as "includes but is not limited to"; the term "example" is used to provide exemplary instances of the item in discussion, not an exhaustive or limiting list thereof, and should be interpreted as "example, but without limitation"; adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

We claim:

1. A support assembly comprising:
a casing comprising an internal mounting seat;
a bearing unit mounted on the internal mounting seat of the casing and having an axis of rotation, the bearing unit comprising:
a radially inner ring;
a radially outer ring;
a plurality of rolling elements between the radially outer ring and radially inner ring;
wherein the casing has an axially inner end and an opposite axially outer end spaced apart along the axis of rotation; and
a first sealing device comprising:
a first shield fixed to the radially outer ring;
a second shield fixed to the radially inner ring and positioned axially internal with respect to the first shield, wherein the first shield and the second shield define between them a first labyrinth seal; and
a protective shield interference fit on a cylindrical seat of the casing and positioned axially internal relative to the second shield;
wherein the protective shield and the second shield define between them a second labyrinth seal; and
the protective shield extends axially inward within an axial boundary of the casing defined at the cylindrical seat of the casing.

2. The support assembly of claim 1, wherein the protective shield comprises:

a radially outer first cylindrical portion that is interference fit on the cylindrical seat of the casing; and
a first flange portion integrally connected to an axially outer end of the cylindrical portion and extending radially inward therefrom.

3. The support assembly of claim 2, wherein the second labyrinth seal comprises:
a first section defined between an inner radial end of the first flange portion and a second cylindrical portion of the second shield fixed to the radially inner ring;
a second section defined between the first flange portion and a second flange portion of the second shield; and
a third section defined between a radially inner surface of the radially outer ring and a radially outer end of the second flange portion.

4. The support assembly of claim 3, further comprising a radially outer volume adjacent the second section of the second labyrinth seal and defined between the first flange portion and an axially inner surface of the radially outer ring, wherein the radially outer volume is filed with lubricating grease.

5. The support assembly of claim 4, further comprising an axial distance between an axially outer annular surface of the first flange portion and the axially inner surface of the radially outer ring of between 1.9 mm and 2.1 mm.

6. The support assembly of claim 5, further comprising an axial distance between the axially outer annular surface of the first flange portion and an axially inner surface of the second flange portion of between 1.5 mm and 1.7 mm.

7. The support assembly of claim 6, wherein the first shield further comprises an elastomeric element formed on a radially outer surface of the first shield, the elastomeric element comprising a sealing lip in contact with a radially outer surface of the radially inner ring.

8. The support assembly of claim 3, wherein:
the first flange portion comprises a first frustoconical portion between the radially outer end and a radially inner end of the first flange portion;
the second flange portion comprises a second frustoconical portion between the radially inner end and a radially outer end of the second flange portion; and
an inclination of the first frustoconical portion is equal to an inclination of the second frustoconical portion.

9. The support assembly of claim 8, wherein the protective shield comprises a thickness between 0.75 mm and 0.85 mm.

10. The support assembly of claim 9, further comprising an interference between the protective shield and the cylindrical seat of the casing between 0.05 mm and 0.15 mm.

11. The support assembly of claim 3, further comprising a radial distance between the radially inner end of the first flange portion and the cylindrical portion of the second shield of between 0.4 mm and 0.6 mm.

12. The support assembly of claim 1, wherein the radially outer ring comprises a convex radially outer surface, wherein the internal mounting seat comprises a shape substantially similar to the convex radially outer surface of the radially outer ring.

* * * * *